(12) United States Patent
Berggren et al.

(10) Patent No.: US 11,118,245 B2
(45) Date of Patent: Sep. 14, 2021

(54) ALKALINE SOLUTION METHOD FOR RECOVERING RARE EARTH ELEMENTS

(71) Applicant: Pioneer Astronautics, Lakewood, CO (US)

(72) Inventors: Mark Berggren, Golden, CO (US); Robert Zubrin, Golden, CO (US); John T Henri, Longmont, CO (US); Boris Nizamov, Highlands Ranch, CO (US)

(73) Assignee: Pioneer Astronautics, Lakewood, CO (US)

( * ) Notice: Subject to any disclaimer, the term of this patent is extended or adjusted under 35 U.S.C. 154(b) by 297 days.

(21) Appl. No.: 15/844,127

(22) Filed: Dec. 15, 2017

(65) Prior Publication Data

US 2018/0171434 A1 Jun. 21, 2018

Related U.S. Application Data

(60) Provisional application No. 62/435,523, filed on Dec. 16, 2016.

(51) Int. Cl.
| | | |
|---|---|---|
| *C22B 59/00* | (2006.01) | |
| *C22B 7/00* | (2006.01) | |
| *C22B 1/00* | (2006.01) | |
| *C22B 3/44* | (2006.01) | |

(52) U.S. Cl.
CPC ............ *C22B 59/00* (2013.01); *C22B 1/005* (2013.01); *C22B 3/44* (2013.01); *C22B 7/008* (2013.01); *Y02P 10/20* (2015.11)

(58) Field of Classification Search
CPC ......... C22B 59/00; C22B 7/008; C22B 1/005; C22B 3/44; C01F 17/00; Y02P 10/234
USPC ...................................................... 423/21.1
See application file for complete search history.

(56) References Cited

U.S. PATENT DOCUMENTS 3,252,754 A * 5/1966 Kraitzer .............. C22B 60/0291
423/17

FOREIGN PATENT DOCUMENTS

JP 002982829 B2 * 11/1999

OTHER PUBLICATIONS

Translation of JP-002982829 B2. (Year: 1999).*
Baba et al. (2013) "Rare-earth Magnet Recycling" Hitachi Review 62(8):452-455.
Binnemans et al. (2013) "Recycling of rare earths: a critical review" Journal of Cleaner Production 51:1-22.

(Continued)

*Primary Examiner* — Steven J Bos
(74) *Attorney, Agent, or Firm* — FisherBroyles, LLP; Cara L. Crowley-Weber; Gregory T. Fettig

(57) ABSTRACT

Novel methods of recovering neodymium and related rare earth elements from permanent magnets of various compositions are described. The methods employ processing steps including converting the magnet material to a higher surface area form such as a powder, treating the mixture with alkaline solutions to form product concentrated in neodymium and rare earth metals. Inexpensive materials such as ammonia, ammonium carbonate, carbon dioxide, water are recycled in a process that uses moderate temperatures, pressures and non-corrosive and environmentally-friendly chemicals.

52 Claims, 1 Drawing Sheet

Rare Earth Materials Recovery System block flow diagram

(56) References Cited

OTHER PUBLICATIONS

De Vasconcellos et al. (2008) "Solubility behavior of rare earths with ammonium carbonate and ammonium carbonate plus ammonium hydroxide: Precipitation of their peroxicarbonates" Journal of Alloys and Compounds 451:42-428.
Gupta (2003) Chemical Metallurgy: Principles and Practice, Chapter 5: Hydrometallurgy, Wiley-VCH, Verlag GmbH & Co. KGaA, Weinheim.
Klocke (1970) "Solubility of Ferrous Iron in Aqueous Ammoniacal Solutions" Doctoral Dissertation, School of Chemical Engineering, University of Pennsylvania.
Klocke and Hixson (1972) "Solubility of Ferrous Iron in Aqueous Ammoniacal Solutions" Ind. Eng. Chem. Process Des. Develop 11(1):141-146.
Lyman and Palmer (1993) "Recycling of Neodymium Iron Boron Magnet Scrap" U.S. Bureau of Mines Report of Investigations 9481, U.S. Department of Interior.
Sprecher et al. (2014) "Recycling Potential of Neodymium: The Case of Computer Hard Drives", Environmental Science and Technology 48:95069513.
Takeda et al. (2006) "Recovery of neodymium from a mixture of magnet scrap and other scrap", Journal of Alloys and Compounds 408-412 pp. 387-390.
Walton et al. (2015) "The use of hydrogen to separate and recycle neodymium-iron-borontype magnets from electronic waste" Journal of Cleaner Production 104:236-241.

* cited by examiner

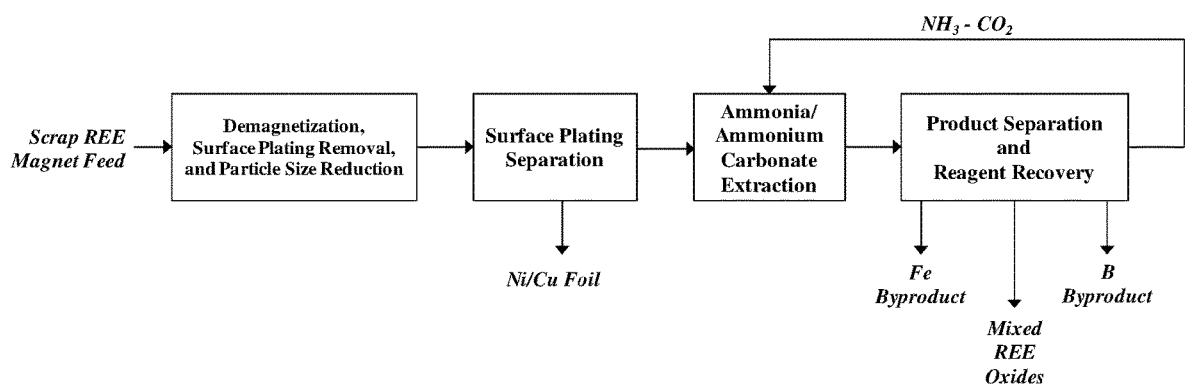
Rare Earth Materials Recovery System block flow diagram

ALKALINE SOLUTION METHOD FOR RECOVERING RARE EARTH ELEMENTS

RELATED APPLICATIONS

This application claims the benefit of U.S. Provisional application No. 62/435,523 titled "Rare Earth Materials Recovery System" filed Dec. 16, 2016 which is incorporated herein by reference.

GOVERNMENT SUPPORT STATEMENT

This invention was made with Government support under Defense Logistics Agency contract no. SP4701-16-M-0094. The Government has certain rights in this invention.

BACKGROUND OF THE INVENTION

Many products contain rare earth elements (REE), such as permanent magnets, cell phones, hearing aids, wind turbines, industrial motors and generators, catalytic converters, and other goods such as semi-conductors, high-performance alloys, capacitors, cathode-ray tubes, lighting, lasers, and battery cathodes. There is very limited U.S. domestic production of these rare earth materials and therefore a risk of foreign reliance. The production of the required amounts of neodymium for magnet production from ores results in large excess production lanthanum and cerium (Binnemans et al., 2013), resulting in a supply imbalance. Currently, only small numbers of REE magnets used in consumer and industrial applications are recycled. The magnets are usually mixed with other wastes, making their recovery and reuse difficult and expensive. Consequently, an economic and clean neodymium and REE process for recovery and recycle from manufacturing and postconsumer magnet wastes will address important supply and logistics issues by allowing for domestic production while avoiding serious environmental issues associated with fresh ore dissolution methods.

Less than 1 percent of rare earths were being recycled as of 2013 (Binnemans et al., 2013). However, the same study estimates that 20,000 tons of REE scrap will be available for the recycling market in 2020 due to end-of-life in applications such as disk drives and motors.

A key issue is the removal of the magnets from the hardware in which they are installed. Several organizations have addressed this issue via automation in the dismantling and recovery of magnets before they are diluted with other wastes (which renders their recovery much more difficult). For example, Hitachi has developed automated methods to recover rare-earth magnets from hard disk drives and air conditioner compressor motors and commenced trials resulting in recovery of tons of material starting in 2012 (Baba et al., 2013). Hard disk drives are passed through a dismantling machine from which the magnet assemblies are recovered and demagnetized. Demagnetized magnets do not exhibit characteristics of permanent magnets but are attracted by magnetic fields. The magnets are separated from the yoke and made available for direct recycling. The rare-earth magnets in air conditioner compressors are recovered in a mechanical unit that opens the casing and extracts the rotor from the motor. A resonance damping system demagnetizes the magnets prior to subjecting them to a drop impact mechanism to release the valuable material for recycling.

Others have proposed and tested a hydrogen decrepitation system for recovery of HDD magnets (Walton et al., 2015). While generally applicable to REE magnets used in a wide range of hardware, the process was applied to hard disk drive magnets by first sectioning and then distorting the magnets (to fracture the structure). The pre-processed magnet assemblies were then subjected to hydrogen processing at about 2 bar gauge pressure for 2 hours at room temperature. The hydrogenated alloy is demagnetized and exhibits a volume expansion that results in decrepitation into small particles that are readily released from their housings. The assemblies were rotated in a drum, which resulted in about 90 percent recovery of the decrepitated magnet material after sieving or other physical separations from the housings.

The direct recycling of NdFeB magnets into new magnets has been demonstrated to recover up to 90 percent of magnetic properties after milling and re-sintering (Walton et al., 2015). However, quality after re-sintering depends on the composition of the scrap, which may not be consistent and controllable as recycling grows to larger scale. Repeated direct recycling will lead to performance declines for a number of reasons. For example, gradual build up of nickel (from surface plating material) will degrade performance (Sprecher et al., 2014), and gradual oxidation of neodymium leads to deterioration in sinterability and magnetic properties (Walton et al., 2015). Therefore, there is a need to supply fresh rare earth elements in conjunction with recycling to enable the manufacture of high performance magnets and other goods such as semi-conductors, high-performance alloys, capacitors, cathode-ray tubes, lighting, lasers, and battery cathodes. The recovery and concentration of neodymium, praseodymium, dysprosium, and other rare earth elements from NdFeB permanent magnets would satisfy this need while taking advantage of the domestic availability of such magnets to solve a key logistical and supply issue.

Several methods have been proposed for the recovery of rare earth elements from manufacturing scrap or postconsumer magnets. Laboratory scale efforts have been carried out to recovery Nd metal from used magnets by extraction in molten magnesium at about 800° C., which forms a Mg—Nd alloy (Takeda et al., 2006). The magnesium is fumed, leaving the Nd behind and resulting in a product containing about 98 percent Nd. This process is advantageous in that it keeps most of the Nd in metallic form, but it presents significant difficulties in high-temperature handling and separation of solid residues from the molten metal. Such pyrometallurgical methods (including direct smelting) are not suitable for oxidized REE materials and they exhibit high energy consumption.

A sulfuric acid process was developed at the U.S. Bureau of Mines (Lyman and Palmer, 1993). An initial effort was carried out to selectively oxidize the neodymium while leaving iron in metallic state followed by physical separation or mild leaching to separate the two main constituents. However, these efforts were not successful due to the small particle size of the material. The results of the work indicated that complete dissolution in sulfuric acid followed by selective precipitation of various components was the best approach. The sulfuric acid leaching process requires significant non-regenerable consumables and expensive materials of construction to hold up to the corrosive operating conditions. Similar problems including large chemical consumption and waste water generation are associated with other hydrometallurgical methods (Binnemans et al., 2013). Gas phase extraction methods avoid the generation of waste water, but require large amounts of toxic and corrosive gas (such as chlorine).

Developing an economically viable process for recovering rare earth materials from the abundance of wasted sources of these materials will have excellent economic value and serve an unmet and long felt environmental need.

The present invention is directed toward overcoming one or more of the problems discussed above.

BRIEF DESCRIPTION OF THE DRAWINGS

FIG. 1 Block diagram for recovery of neodymium and related rare earth elements from permanent rare earth magnets.

SUMMARY OF THE INVENTION

Novel methods of recovering neodymium and related rare earth elements from permanent magnets of various compositions are described. The methods employ processing steps including converting the magnet material to a higher surface area form such as a powder, treating the mixture with an aqueous solution of ammonia and/or ammonium carbonate to form a slurry, filtering the solids to yield a filtrate containing dissolved magnet constituents, treating the filtrate by adjusting its pH, Eh, temperature, or adding reagents such as carbon dioxide, ammonia, ammonium hydroxide, and ammonium carbonate to form solids concentrated in said neodymium and rare earth metals. In some cases, most of the magnet constituents are dissolved, after which constituents are selectively precipirated from solution. In other cases, constituents are selectively dissolved, resulting in concentration of constituents in both liquid and solid phases. Materials such as ammonia, ammonium carbonate, carbon dioxide, ammonium hydroxide, amines, and water are recycled in a process that uses moderate temperatures, pressures and non-corrosive and environmentally-friendly chemicals.

DESCRIPTION

The Rare Earth Materials Recovery System (REMRS) recovers rare earth elements from compositions comprising other metals such as permanent magnets. In one embodiment, the Rare Earth Materials Recovery System (REMRS) recovers neodymium and related rare earth elements from permanent magnets of variable composition recycled from hard disk drives (HDD), motors, generators, and other industrial, military, and consumer products. In one embodiment the REMRS recovers rare earth oxides as high-quality feed stock to support manufacture of new high performance magnets and other goods such as semi-conductors, high-performance alloys, capacitors, cathode-ray tubes, lighting, lasers, and battery cathodes.

The present invention is premised on the use of ammonia/ammonium carbonate solutions to extract and separate REE and iron from magnets and other REE-containing materials by selecting conditions of pH, Eh, temperature, and pressure to produce soluble ammine complexes with metals of interest. Changes to pH, Eh, temperature, and pressure are then applied to cause dissolved ammine complexes to decompose, resulting in precipitation of solids. By targeting specific conditions of pH, Eh, temperature, and pressure, REE-containing materials may be processed to selectively dissolve constituents or to dissolve all constituents followed by change to pH, Eh, temperature, and pressure to selectively decompose constituents to form solid products rich in REE or iron constituents.

Experiments carried out on model compounds as well as actual NdFeB magnet material showed the potential for the following three approaches to processing recycled magnets.

Dissolve all magnet constituents and then selectively and separately precipitate rare earth elements and iron.

Selectively dissolve rare earths from the magnet structure (following oxidation of iron to ferric form to minimize or eliminate its solubility)

Selectively dissolve iron from the magnet structure (possibly requiring selective oxidation of rare earths to reduce their solubility)

In one embodiment the process recovers rare earth elements from an ore.

In one embodiment, the process recovers rare earth elements from wastes derived from mining or extracting and processing other materials such as coal, coal ash, minerals, metals, fuels, or any solid-forming byproduct.

In other embodiments, the process is useful in recovering rare earth and precious metals from an asteroid and other extra-terrestrial site such as planet Mars or the moon.

In one embodiment, the process is used in asteroid mining to recover valuable rare earth metals and precious metals.

In one embodiment of the process an initial low-temperature, low-pressure hydrogen decrepitation step is carried out to demagnetize, produce fine particles, and release surface coatings.

In one embodiment, a regenerable aqueous ammonia/ammonium carbonate solution is then used to decompose permanent magnet alloy compositions at low temperature and pressure into insoluble precipitates and soluble metal complexes.

In one embodiment, a regenerable aqueous ammonia/ammonium carbonate solution is used to decompose permanent magnet alloy compositions at low temperature and pressure into their iron, rare-earth elements, and boron constituents to enable recovery and recycling for production of new materials.

In one embodiment, after selective recovery of constituents from the mixture, the solution is directly recycled, or ammonia and carbon dioxide are recovered by evaporation and absorption or condensation, and then recycled to the process. The novel application of an ammonia/ammonium carbonate dissolution process avoids the costs and environmental impacts of alternate aqueous treatments using strong sulfuric, hydrochloric, nitric, or hydrofluoric acids, which all produce salts or waste byproducts that must be disposed.

In one embodiment, the dissolution process is typically carried out at temperatures below 100° C.

In one embodiment, the dissolution process is typically carried out at temperatures below about 60° C.

In one embodiment, the dissolution process is typically carried out at temperatures between ambient and 100° C.

In one embodiment, the dissolution process is typically carried out at temperatures between ambient and about 60° C.

In one embodiment, the dissolution process is typically carried out at temperatures below about 60° C. and at low pressure.

In one embodiment, the dissolution process is carried out in saturated ammonium carbonate solution.

In one embodiment, the dissolution process is carried out in a 6 to 10% ammonium carbonate solution. In one embodiment, the dissolution process is carried out in solutions between 1% and concentrations up to saturated ammonium carbonate.

In one embodiment, the dissolution process is typically carried out in vessels constructed of stainless steel, plastic, fiberglass, glass, or other metals using ammonia and carbonate concentrations on the order of 10 and 6 weight percent.

In one embodiment, the dissolution process is typically carried out in vessels constructed of stainless steel, plastic, fiberglass, glass, or other metals using ammonia and carbonate concentrations between 1 and 30 weight percent In one embodiment of the REMRS process, a hydrogen decrepitation procedure is applied before aqueous processing to generate fine NdFeB particles and to release the surface plating materials. This may take place during upstream magnet recovery for recycling or as an initial step in REMRS to demagnetize and prepare the materials for processing. Nickel or nickel-copper plating and other metallic plating materials are released during decrepitation and then removed using dry sieving or other physical separation methods based on differences in density, particle shape, etc. to remove the majority of the coating materials prior to aqueous processing.

In one embodiment, recycled magnets are subjected to thermal treatment under inert gas to demagnetize the magnets by exposure to temperatures approaching or in excess of their Curie temperature while keeping the magnet materials in metallic state. The demagnetized magnets are then subjected to magnetic separation and sieving to remove plating materials followed by crushing and grinding prior to ammonia/ammonium carbonate dissolution.

In one embodiment, recycled magnets are subjected to thermal treatment under an oxidizing gas to demagnetize the magnets while oxidizing the magnet materials to oxide state. The demagnetized magnets are then subjected to magnetic separation and sieving to remove plating materials followed by crushing and grinding prior to ammonia/ammonium carbonate dissolution.

In one embodiment, the NdFeB particles are next subjected to ammonia/ammonium carbonate dissolution to remove residual nickel and copper (from plating materials) and to decompose the NdFeB alloy to allow for selective recovery of neodymium and related REE from the remaining alloy constituents. Following dissolution, the various decomposed and/or dissolved constituents are separated and recovered to produce a high-quality Nd-REE oxide product as well as several byproducts. Concurrently, ammonia and ammonium carbonate reagents are recovered and recycled to the dissolution step. A block flow diagram of the Rare Earth Materials Recovery System is shown in FIG. 1.

In one embodiment, in addition to the removal of surface plating materials following hydrogen decrepitation, some additional pretreatment may be applied to enhance the downstream ammonia/ammonium carbonate dissolution extent and kinetics.

In another embodiment, pretreatment may include additional grinding of the brittle magnet material to open additional surface area.

In other embodiments, additional pretreatment may be applied to de-hydrogenate the decrepitated magnet material (by application of vacuum), or to adjust the oxidation state prior to dissolution. In one embodiment, an ammonium carbonate solution is used to dissolve magnet composition. In one embodiment, an ammonium carbonate plus ammonia solution is used to dissolve magnet composition In one embodiment of the process, pretreatment of magnet powders by exposure to air at temperatures between 50 and 1500° C. is used to oxidize magnet powder prior to dissolution. In another embodiment of the process, pretreatment of magnet powders by exposure to air at temperatures between 100 and 1200° C. is used to oxidize magnet powder prior to dissolution. In a preferred embodiment of the process, pretreatment of magnet powders by exposure to air at temperatures between 400 and 800° C. is used to oxidize magnet powder prior to dissolution.

In one embodiment of the process, pretreatment of magnet powders by exposure to hydrogen at temperatures between 50 and 1500° C. is used to reduce iron and other oxides to metal prior to dissolution.

In another embodiment of the process, pretreatment of magnet powders by exposure to hydrogen at temperatures between 100 and 1200° C. is used to reduce iron and other oxides to metal prior to dissolution.

In a preferred embodiment of the process, pretreatment of magnet powders by exposure to hydrogen at temperatures between 400 and 800° C. is used to reduce iron and other oxides to metal prior to dissolution.

In one embodiment of the process, an ammonium carbonate solution is used to selectively dissolve REE from oxidized magnet composition.

In one embodiment of the process, an ammonium carbonate plus ammonia solution to selectively dissolve REE from oxidized magnet composition.

In one embodiment of the process, addition of $NH_3$ or $NH_4OH$ causes precipitation of dissolved REE.

In one embodiment of the process, addition of $NH_3$ or $NH_4OH$ causes precipitation of dissolved iron.

In one embodiment of the process, $CO_2$, air, oxygen, hydrogen peroxide, etc. is used to change pH and Eh to cause precipitation.

In one embodiment of the process, conventional acids or bases are used to adjust pH to cause precipitation.

In one embodiment of the process, heat, steam, or evaporation is employed to cause precipitation. In one embodiment of the process, vacuum or evaporation is employed to cause precipitation. In one embodiment of the process, metal addition, $H_2$, CO, carbon, or other reducing agents are employed to adjust pH and Eh to cause precipitation.

In one embodiment of the process, direct recycle of ammonium carbonate/ammonia solution is done after precipitation of solids.

In one embodiment of the process, steam stripping of solutions to recover clean $NH_3$ and $CO_2$ for regeneration of extraction solutions is done.

In one embodiment of the process, multiple dissolution stages are employed to further separate REE from iron or other contaminants.

In one embodiment of the process, ammonium sulfate, chloride, bromide, iodide are used instead of carbonate.

In one embodiment of the process, the process feed is obtained asteroid, Moon, Mars, or other extraterrestrial resources.

In one embodiment of the process, precious metals are isolated by the steps of the process.

In situ resource utilization (ISRU) is defined as the collection, processing, storing and use of materials encountered in the course of human or robotic terrestrial or space exploration that replace materials that would otherwise be brought from a remote location such as another geographic location or another planet or location in space.

In some embodiments of the claims, the process employs ISRU leveraging resources found or manufactured on other astronomical objects (the Moon, Mars, asteroids, etc.) to fulfill or enhance the requirements and capabilities of a space or terrestrial mission.

EXPERIMENTAL

Although the following experimental procedures are described in detail, they are illustrative and not limitative of the reminder of the description. The magnets, minerals, and reagents used in preparing these compounds are either available from commercial vendors and chemical suppliers such as K&J Magnetics, SigmaAldrich, Alfa Aesar, TCI, Reade Minerals, etc. or are prepared by methods well known to a person of ordinary skill in the art, following procedures described in literature. Samples were analyzed using Scanning Electron Microscope/Energy Dispersive X-Ray Spectroscopy (SEM/EDS) and x-ray fluorescence (XRF).

The SEM image and EDS samples were mounted on carbon tape for SEM imaging and elemental analysis by EDS. LV (low vacuum) mode was used to prevent the samples from charging. Images, elemental map data and approximate elemental composition data were obtained.

Experiment 1

140.43 gms (cNH4)$_2$CO$_3$ made up to 500 ml solution in a standard flask with deoxygenated distilled water. Some ammonium carbonate solids were undissolved. Added 400 gm saturated (NH$_4$)$_2$CO$_3$ solution to a 1 lit. 2-neck RB flask fitted with a reflux condenser and septa on its necks using a magnetic stir bar for agitation and He balloon for inert atmosphere. After the ammonium carbonate was stirred at room temperature (RT, ~20° C.) as He gas was bubbled through the solution the Fe powder was added followed by the Nd/Fe/B powder (0.403 gm Iron powder+3.597 gm NdFeB decrepitated magnet powder). Analysis by the total powder feed by Scanning Electron Microscope/Energy Dispersive X-Ray Spectroscopy (SEM/EDS) showed a rare earth elements (REE):iron (Fe) mass ratio of 0.42. Slurry pH=8.96, Eh=−368 mV. Stirred reaction overnight. The grey/black starting material turned to a blue/light grey powder slurry overnight. pH=9.1, Eh=−385 mV. Solids were filtered and dried. Product turned tan color from blue/grey at ambient conditions. Weight of initial filtered solids (Primary Filter Cake)=3.094 gm dried in RT air, which reduced to 1.947 gm after drying at ~120° C. Analysis by SEM/EDS showed a REE:Fe mass ratio of 0.006. The filtrate precipitated more solids upon exposure to small amounts of air (Second Filter Cake) which were filtered and dried at RT=0.187 gms or 0.113 gm after drying at ~120° C. SEM/EDS analysis showed a REE:Fe mass ratio of 0.02. Additional precipitate continued to be formed and filtered from the resulting slurry, resulting in the Third Filter Cake, which weighed 1.093 gm (air dried at RT) or 0.959 gm after drying at 120° C. SEM/EDS analysis showed a REE:Fe mass ratio of 0.97. Additional precipitate was scraped from the filtrate flask walls ("Wall Scrapings"), which weighed 0.461 gm (air dried at RT) or 0.387 gm (after drying at 120° C.). The REE:Fe mass ratio by SEM/EDS was 9.4. The filtrate was then reacted by bubbling carbon dioxide at RT with stirring to form a precipitate which was filtered (Fourth Filter Cake), weighing 0.388 gm after air drying or 0.054 gm after drying at 120 C. SEM/EDS analysis of the fourth filter cake showed a REE:Fe mass ratio of >100 (no iron was detected).

Experiment 2

137.43 gms (NH$_4$)$_2$CO$_3$ made up to 500 ml solution in a standard flask with deoxygenated distilled water. Some ammonium carbonate solids were undissolved. Added 400 gm saturated (NH$_4$)$_2$CO$_3$ solution to a 1 lit. 2-neck RB flask fitted with a reflux condenser and septum on its necks with a magnetic stir bar for stirring and He balloon for inert atmosphere. After the ammonium carbonate was stirred at RT (~20° C.) as He gas was bubbled through the solution. The Nd/Fe/B powder was added with vigorous stirring. 4.03 gms NdFeB decrepitated magnet powder was added to the flask containing (NH$_4$)$_2$CO$_3$ solution. Analysis by the total powder feed by Scanning Electron Microscope/Energy Dispersive X-Ray Spectroscopy (SEM/EDS) showed a rare earth elements (REE):iron (Fe) mass ratio of 0.52. A stream of He gas was then purged over the reaction surface and a balloon was placed on the top septum to maintain inert He atmosphere with stirring at RT. Slurry pH=8.96, Eh=−394 mV. Stirred overnight. The grey/black starting material showed only traces of reaction. Slurry pH=9.05, Eh=−391 mV. GC showed 44% hydrogen, 0.29% O$_2$ and 8.38% CO$_2$. Left to stir over the weekend. The black grey starting material turned blue/grey slurry/ powder with a blue supernatant solution. Slurry pH=9.1, Eh=−399 mV. Solids were filtered and dried at RT. Filter cake turned tan color from blue/grey. Weight of filtered solids (Primary Filter Cake)=8.22 gm, which reduced to 3.52 gm after drying at ~120° C. Analysis by SEM/EDS showed a REE:Fe mass ratio of 0.15. The filtrate precipitated more solids which were filtered and dried at RT=0.316 gms, which after drying at −120° C. reduced to 0.188 gm. Analysis by SEM/EDS showed a REE:Fe mass ratio of 0.09. Filtrate pH=9.16, Eh=−346 mV. The filtrate was then reacted by bubbling CO$_2$ gas at room temperature to precipitate solids which were allowed to stand overnight and filtered. Filtrate after CO$_2$ bubbling showed a pH=8.73 & Eh=252 mV. Moist solids after filtration weighed 11.744 gms. After drying in oven at ~120° C., solids weighed 0.64 gm. Analysis by SEM/EDS showed a REE:Fe mass ratio of 4.6.

Experiment 3

A 400 milliliter (NH$_4$)$_2$CO$_3$ solution consisting containing 146 gm/liter total NH$_3$ and 97 gpl total CO$_3$ was prepared using deoxygenated distilled water. The solution was placed in a reaction flask fitted with a reflux condenser and septa over the flask ports and necks. After purging the solution with helium gas to displace air, 4.0 grams of powdered NdFeB magnet powder prepared by hydrogen decrepitation was added while continuously mixing by a magnetic stir bar at ambient temperature (about 20° C.). Analysis of the powdered feed by x-ray fluorescence (xrf) showed a REE:Fe mass ratio of 0.52. A balloon filled with helium gas was connected to the septum above the reflux condenser, providing an oxygen-free environment for the experiment. Slurry pH=9.8, Eh=−470 mV. The slurry was stirred for three days. The grey/black starting material turned to a pale, milky blue color. The reaction flask was opened, and initial solids recovery and filtration were conducted immediately thereafter. Some residual solids attached to the magnetic stir bar were recovered. The solids attached to the stir bar were recovered, dried (0.78 gm), and analyzed by SEM/EDS showing a total REE:Fe mass ratio of 2.24. The remaining slurry was filtered to recover a first cake of 1.26 gm (after washing with an ammonium carbonate solution similar to the extraction solution to displace dissolved solids from the filter cake and drying at about 120° C.) showing a total REE:Fe mass ratio of 12.64. The recovered filtrate in the reaction flask was exposed to an air head space while mixing, resulting in formation of a precipitate. The slurry was filtered to recover a second cake of 2.08 gm after drying showing a total REE:Fe mass ratio of 0.042 by SEM/EDS. Upon further exposure to air, additional precipitate formed. The slurry was filtered to recover a third cake of 0.94 gm after drying showing a total REE:Fe mass ratio of 0.0087 by SEM/EDS. The results showed that both iron and REE can be dissolved from magnet particle mixtures and that iron-rich and REE-rich fractions can be recovered.

Experiment 4

A 400 milliliter $(NH_4)_2CO_3$ solution consisting containing 85 gm/liter total $NH_3$ and 150 gpl total $CO_3$ was prepared in distilled water. The solution was placed in a reaction flask fitted with a reflux condenser. Powdered, oxidized NdFeB magnet powder was prepared by hydrogen decrepitation followed by sieving to remove nickel-copper plating and then calcination in air at 700° C., after which it was cooled to ambient temperature (about 20° C.). 4.0 gm of the prepared magnet powder was added to the solution while continuously mixing by a magnetic stir bar at ambient temperature (about 20° C.). Analysis of the powdered feed showed a REE:Fe mass ratio of 0.43. The reaction flask ports were left open to allow exposure to air. The slurry pH=9.0; Eh=+115 mV. The slurry was stirred for three days while showing a dark red/brown color. The reaction flask was opened, and initial solids recovery and filtration were conducted immediately thereafter. No significant amount of residual solids were attached to the magnetic stir bar. The slurry was filtered to recover a first cake of 1.65 gm (after washing with an ammonium carbonate solution similar to the extraction solution to displace dissolved solids from the filter cake and drying at about 120° C.). Upon further exposure to air, additional precipitate formed. The slurry was then filtered to recover a second cake of 1.43 gm after drying. The resulting filtrate was evaporated to recover 0.19 gm of solids after drying at about 120° C. The solids showed a total REE:Fe mass ratio of 26.5 by SEM/EDS. The results demonstrated that REE oxides can be selectively dissolved from magnet solids mixtures containing iron oxide to produce an REE-rich product.

Prophetic Example of REE Processing of Ores and Minerals:

Based on the response of oxide compound to ammonia/ammonium carbonate extractions as illustrated in Experiment 4, the Rare Earth Materials Recovery Process is applicable to ores and minerals including but not limited to carbonatite, bastnasite, monazite. REE-containing minerals and their concentrates are added to a solution containing ammonia/ammonium carbonate. The minerals are first crushed and ground to a particle size conducive to dissolution. The minerals may be subjected to processing as-is and after calcining to convert carbonates and other mineral forms to oxides. Solutions containing soluble ammine complexes of REE can then be treated by adjustment to pH, Eh, temperature, and pressure to precipitate REE-rich compounds.

What is claimed is:

1. A method of recovering a rare earth element (REE) comprising the steps of:
   converting a variable composition mixture to a higher surface area form;
   treating the converted variable composition mixture with an alkaline solution;
   isolating the rare earth element in the alkaline solution; and
   treating the alkaline solution, after isolating the rare earth element, with carbon dioxide to form solids concentrated in said rare earth element.

2. The method of claim 1 where said variable composition mixture before being converted to the higher surface area form is a permanent neodymium iron boron magnet.

3. The method of claim 1 where the alkaline solution is an ammonium hydroxide/ammonium carbonate solution.

4. The method of claim 1 where said variable composition mixture before being converted to the higher surface area form is a permanent samarium-cobalt magnet.

5. The method of claim 1 where said variable composition mixture before being converted to the higher surface area form is a REE-containing waste.

6. A method of claim 1 where ammonium carbonate of the alkaline solution is recycled as ammonia and carbon dioxide gas after use.

7. A method of claim 1 where ammonium carbonate of the alkaline solution is directly recycled after use.

8. A method of claim 1 where the converted variable composition mixture is obtained as a powder of neodymium and other elements by hydrogen decrepitation of a neodymium magnet.

9. A method of claim 1 where the converted variable composition mixture is obtained as a powder of neodymium and other elements by crushing and grinding.

10. A method of claim 1 where magnetic properties of the converted variable composition mixture are removed by exposure to temperatures approaching or exceeding its Curie temperature.

11. A method of claim 1 where the converted variable composition mixture is converted to oxide form.

12. A method of claim 1 where the alkaline solution comprises a saturated ammonium carbonate solution.

13. A method of claim 1 where the alkaline solution comprises a solution of ammonia and ammonium carbonate.

14. A method of claim 13 where a concentration of the solution of the ammonia and the ammonium carbonate is between 1% and saturated.

15. A method of claim 13 where the solution of the ammonia and the ammonium carbonate is heated to a temperature between −20 and 100° C.

16. A method of claim 1 further comprising treating the converted variable composition mixture with the alkaline solution at a pressure between 0 and 500 psi.

17. A method of claim 1 further comprising treating the converted variable composition mixture with the alkaline solution in an oxygen free inert atmosphere.

18. A method of claim 1 further comprising treating the converted variable composition mixture with the alkaline solution in an oxygen-containing atmosphere.

19. A method of claim 1 where ultrasonic waves are used in the treating the converted variable composition mixture with an alkaline solution step.

20. A method of claim 1 further comprising treating the converted variable composition mixture with the alkaline solution under ambient conditions.

21. A method of claim 1 further comprising treating the converted variable composition mixture with the alkaline solution in a continuous loop over the converted variable composition mixture.

22. A method of claim 1 where dysprosium and praseodymium are isolated along with neodymium.

23. A method of claim 1 where a filtrate of the converted variable composition mixture and the alkaline solution are treated by evaporation.

24. A method of recovering a rare earth element (REE) from an ore mineral composition comprising the steps of:
   converting the ore mineral composition to a higher surface form,
   treating the converted ore mineral composition with an alkaline solution, isolating the REE from the treated and converted ore mineral composition in the alkaline solution, and treating the alkaline solution, after isolating the REE, with carbon dioxide to form solids concentrated in said REE.

25. A method of claim 24 where ammonium carbonate of the alkaline solution is recycled as ammonia and carbon dioxide gas after use.

26. A method of claim 24 where ammonium carbonate of the alkaline solution is directly recycled after use.

27. A method of claim 24 where the alkaline solution comprises a saturated ammonium carbonate solution.

28. A method of claim 24 where a solution of ammonia and ammonium carbonate is used in isolating the REE from the treated and converted ore mineral composition and the alkaline solution.

29. A method of claim 24 where the converted ore mineral composition is obtained as a powder of neodymium compounds and other chemical compounds by crushing and grinding.

30. A method of claim 24 where the converted ore mineral composition is converted to oxide form.

31. A method of claim 28 where a concentration of the ammonia and ammonium carbonate solution is between 1% and saturated.

32. A method of claim 28 where the ammonia and ammonium carbonate solution is heated to a temperature between −20 and 100° C.

33. A method of claim 24 further comprising treating the converted ore mineral composition with the alkaline solution in an oxygen free inert atmosphere.

34. A method of claim 24 further comprising treating the converted ore mineral composition with the alkaline solution in an oxygen-containing atmosphere.

35. A method of claim 24 where ultrasonic waves are used in the treating the converted ore mineral composition with an alkaline solution step.

36. A method of claim 24 further comprising treating the converted ore mineral composition with the alkaline solution under ambient conditions.

37. A method of claim 24 further comprising treating the converted ore mineral composition with the alkaline solution in a continuous loop over the converted ore mineral composition.

38. A method of claim 24 where dysprosium and praseodymium are isolated along with neodymium.

39. A method of claim 24 where the alkaline solution is treated with hydrogen peroxide.

40. A method of claim 24 where pretreatment of the converted ore mineral composition, by exposure to hydrogen at temperatures up to 1500° C., is used to reduce oxidation of iron and other metals.

41. A method of claim 24 where an ammonium carbonate solution is used to selectively dissolve the REE in isolating the REE from the treated and converted ore mineral composition upon oxidation of the treated and converted ore mineral composition.

42. A method of claim 24 where an ammonium carbonate plus an ammonia solution are used to selectively dissolve the REE from the ore mineral composition upon oxidation of the ore mineral composition.

43. A method of claim 24 where an addition of $NH_3$ or $NH_4OH$ to the converted ore mineral composition causes precipitation of the REE when treating the converted ore mineral composition with the alkaline solution.

44. A method of claim 24 where addition of $NH_3$ or $NH_4OH$ to the converted ore mineral composition causes precipitation of iron when treating the converted ore mineral composition with the alkaline solution.

45. A method of claim 24 where at least one of $CO_2$, air, oxygen, or hydrogen peroxide is used to change pH, Eh to cause precipitation of the REE when treating the converted ore mineral composition with the alkaline solution.

46. A method of claim 24 further comprising adjusting pH to cause precipitation of the REE when treating the converted ore mineral composition with the alkaline solution.

47. A method of claim 24 where heat, steam, or evaporation is employed to cause precipitation of the REE when treating the converted ore mineral composition with the alkaline solution.

48. A method of claim 24 where vacuum or evaporation is employed to cause precipitation of the REE when treating the converted ore mineral composition with the alkaline solution.

49. A method of claim 24 where at least one of metal, $H_2$, CO, or carbon are employed to adjust pH, Eh of the REE when treating the converted ore mineral composition with the alkaline solution to cause precipitation of the REE.

50. A method of claim 24 further comprising recycling an ammonium carbonate/ammonia solution after a precipitation of solids when treating the converted ore mineral composition with the alkaline solution.

51. A method of claim 24 further comprising steam stripping the alkaline solution to recover clean $NH_3$ and $CO_2$.

52. A method of claim 24 where multiple dissolution stages are employed to further separate the REE from iron.

* * * * *